United States Patent
Kanenari et al.

(10) Patent No.: US 7,117,911 B2
(45) Date of Patent: Oct. 10, 2006

(54) PNEUMATIC TIRE HAVING RUN FLAT CAPABILITY

(75) Inventors: Daisuke Kanenari, Hiratsuka (JP); Kazuto Yamakawa, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 84 days.

(21) Appl. No.: 10/399,678

(22) PCT Filed: Sep. 2, 2002

(86) PCT No.: PCT/JP02/08886

§ 371 (c)(1),
(2), (4) Date: Apr. 21, 2003

(87) PCT Pub. No.: WO03/029029

PCT Pub. Date: Apr. 10, 2003

(65) Prior Publication Data

US 2004/0031550 A1 Feb. 19, 2004

(30) Foreign Application Priority Data

Sep. 5, 2001 (JP) .............................. 2001-269232

(51) Int. Cl.
*B60C 17/00* (2006.01)
*B60C 17/04* (2006.01)
*B60C 5/14* (2006.01)

(52) U.S. Cl. ..................... 152/516; 152/510; 152/520

(58) Field of Classification Search ................ 152/510, 152/514, 516, 517
See application file for complete search history.

(56) References Cited

U.S. PATENT DOCUMENTS 5,256,738 A * 10/1993 Chasser et al. .......... 525/330.9
6,079,465 A * 6/2000 Takeyama et al. .......... 152/510
6,293,327 B1 * 9/2001 Minagawa et al. ......... 152/564
6,342,567 B1 * 1/2002 Minagawa et al. ......... 525/192
6,475,316 B1 * 11/2002 Kirk et al. ..................... 156/82
6,759,136 B1 * 7/2004 Kanenari et al. ........... 428/493

FOREIGN PATENT DOCUMENTS

| EP | 0 722 850 A1 | 7/1996 |
|---|---|---|
| EP | 0 857 761 A1 | 8/1998 |
| EP | 0 943 656 A1 | 9/1999 |
| EP | 0 969 039 A1 | 1/2000 |
| JP | 52-091903 U | 7/1977 |
| JP | 07070372 * | 3/1995 |

(Continued)

OTHER PUBLICATIONS

Notification of the First Office Action of the Chinese Patent Office for the application No. 02802785.X, notified Apr. 22, 2005, with English translation of the First Office Action.

(Continued)

*Primary Examiner*—Justin Fischer
(74) *Attorney, Agent, or Firm*—Rader, Fishman & Grauer PLLC

(57) ABSTRACT

A pneumatic tire having a runflat capability provided with a crescent shaped reinforcing rubber layer at the side part thereof, wherein an inner layer is composed of a thermoplastic elastomer composition containing (A) at least one thermoplastic resin having an air permeation coefficient of $100 \times 10^{-12}$ cc·cm/cm²·sec·cmHg or less and a Young's modulus of more than 500 MPa and (B) at least one elastomer ingredient having an air permeation coefficient of $50 \times 10^{-12}$ cc·cm/cm²·sec·cmHg or more and a Young's modulus of 500 MPa or less in amounts of at least 30% by weight based upon the total polymer ingredients and having an air permeation coefficient of $100 \times 10^{-12}$ cc·cm/cm²·sec·cmHg or less.

4 Claims, 1 Drawing Sheet

FOREIGN PATENT DOCUMENTS

| | | | |
|---|---|---|---|
| JP | 08-216610 A | 8/1996 |
| JP | 08-259741 A | 10/1996 |
| JP | 09052502 | * | 2/1997 |
| JP | 10081108 | * | 3/1998 |
| JP | 11-10779 A1 | 1/1999 |
| JP | 11-100463 A | 4/1999 |
| JP | 11-199713 A | 7/1999 |
| JP | 11-240108 A | 9/1999 |
| WO | WO 01/96476 | * | 12/2001 |

OTHER PUBLICATIONS

Japanese Office Action for the Application No. 2003-532315 mailed on Jul. 12, 2005.

* cited by examiner

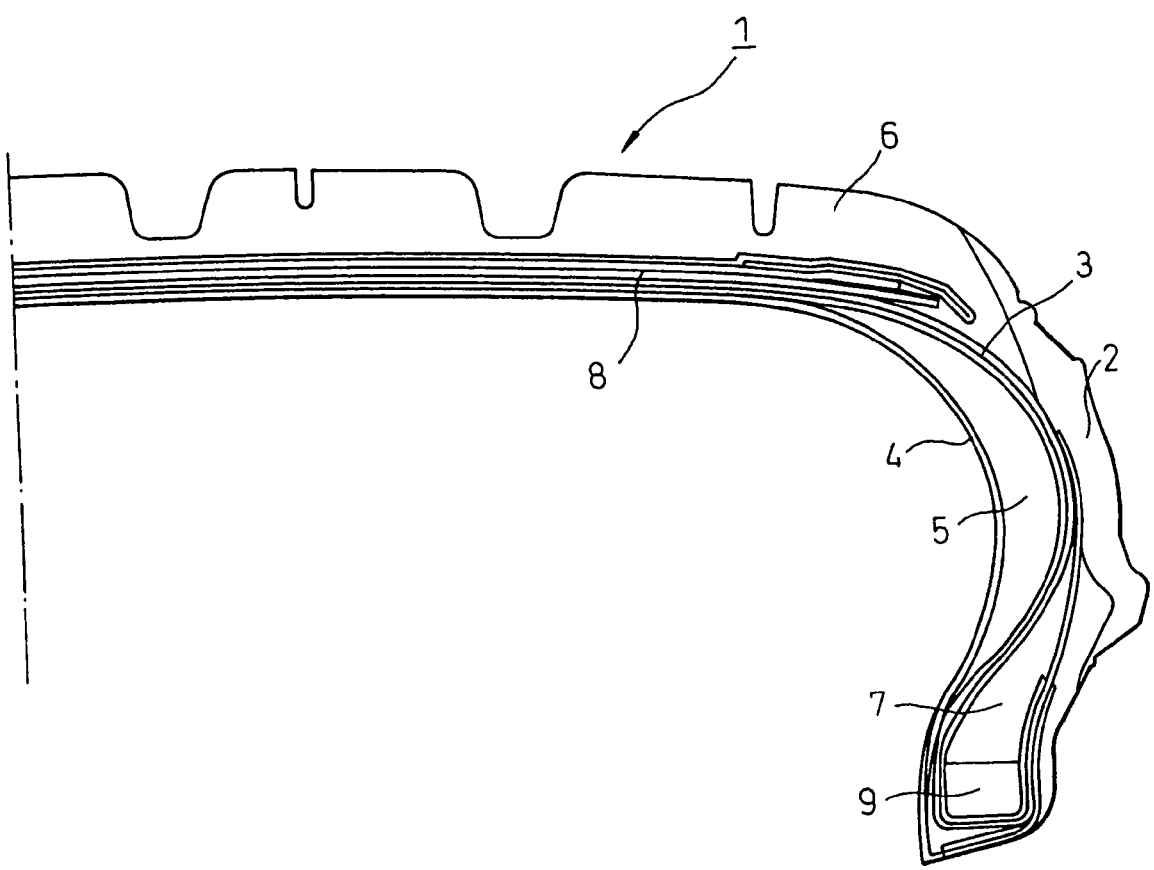

PNEUMATIC TIRE HAVING RUN FLAT CAPABILITY

TECHNICAL FIELD

The present invention relates to a pneumatic tire having a runflat capability, more particularly relates to a pneumatic tire using a specific member for an inner liner and further a reinforcing rubber so as to greatly reduce the weight of the tire and to reduce a heat buildup as well as to extend the running distance at the time of a puncture.

BACKGROUND ART

In the past, to impart a runflat capability enabling a tire to be driven on over a predetermined distance even if rapidly falling in internal pressure due to a puncture, burst, etc., for example, as shown in FIG. 1, there has been known a safety tire in which a reinforcing rubber 5 in the shape of crescent is inserted between a carcass 3 and an inner liner layer 4 in the side wall part 2 of a pneumatic tire 1. Note that, in FIG. 1, 6 indicates a cap tread, 7 indicates a bead filler, 8 indicates a belt layer and 9 indicates a bead. To enable the tire to be driven on even with a puncture by this configuration, it is sufficient to make the reinforcing rubber layer 5 a certain thickness or more. However, the reinforcing rubber layer 5 is too thick, there was the problem that the weight is increased. Further, if driven on in a state with the air expelled, the side part 2 will greatly flex and heat will build up, and therefore an inner liner layer 4 of butyl rubber having a large heat buildup will immediately peel off and break. Even if repairing the puncture before the reinforcing rubber layer 5 breaks, there was the problem that sometimes the tire could no longer be reused.

DISCLOSURE OF INVENTION

Accordingly, the object of the present invention is to solve the above problems and to provide a pneumatic tire having a runflat capability which is capable of reducing the weight of the tire, suppressing heat buildup, and extending the running distance of the tire at the time of a puncture.

In accordance with the present invention, there is provided a pneumatic tire having a runflat capability provided with a crescent shaped reinforcing rubber layer in the side part thereof comprising an inner liner, which comprises a thermoplastic elastomer composition containing (A) at least one thermoplastic resin having an air permeation coefficient of $100 \times 10^{-12}$ cc·cm/cm$^2$·sec·cmHg or less and a Young's modulus of more than 500 MPa and (B) at least one elastomer component having an air permeation coefficient of $50 \times 10^{-12}$ cc·cm/cm$^2$·sec·cmHg or more and a Young's modulus of 500 MPa or less, respectively, each in an amount of at least 30% by weight based upon the total polymer components and having an air permeation coefficient of $100 \times 10^{-12}$ cc·cm/cm$^2$·sec·cmHg or less.

In accordance with the present invention, there is also provided the pneumatic tire having a runflat capability wherein said inner liner compose of said thermoplastic elastomer composition and a carcass and a reinforcing rubber layer are bonded, by vulcanization, with an adhesive comprising 100 parts by weight of a total amount of at least 30 parts by weight of a polymer having a carboxyl group, epoxy group or isocyanate group and the balance of a styrene-butadiene-styrene-based copolymer or styrene-isoprene-styrene-based copolymer or a partially hydrogenated product thereof, into which 20 to 150 parts by weight of a tackifier resin is compounded.

In accordance with the present invention, there is further provided the pneumatic tire having a runflat capability wherein the crescent shaped reinforcing rubber of the side part thereof comprises a rubber composition composed of 100 parts by weight of a total rubber amount of a rubber containing at least 40 parts by weight of an ethylenically unsaturated nitrile-conjugated diene-based highly saturated rubber having a content of conjugated diene units of 30% by weight or less, into which 120 parts by weight or less of a metal salt of an ethylenic unsaturated carboxylic acid and an organic peroxide are compounded.

In according to the present invention, there is still further provided the pneumatic tire having a runflat capability wherein, between the crescent shaped reinforcing rubber and the carcass, a rubber composition comprising 100 parts by weight of a total rubber amount of 50 to 85 parts by weight of at least one diene-based rubber selected from the group comprised of a natural rubber, polyisoprene rubber, polybutadiene rubber, and conjugated diene-aromatic vinyl copolymer rubber and 15 to 50 parts by weight of an ethylenic unsaturated nitrile-conjugated diene-based highly saturated rubber having a content of conjugated diene units of 30% by weight or less, and 10 to 60 parts by weight of a metal salt of an ethylenic unsaturated carboxylic acid, 0.3 to 10 parts by weight of an organic peroxide and 5 to 50 parts by weight of a co-agent (i.e., a co-crosslinking agent) in the state of liquid at room temperature and having an acryl group, methacryl group, or allyl group.

BRIEF DESCRIPTION OF DRAWINGS

The present invention will now be described specifically with reference to a drawing. FIG. 1 is a view of the cross-section of a pneumatic tire having a runflat capability of a side reinforced type.

MODE FOR CARRYING OUT THE INVENTION

In the present invention, when using a thermoplastic elastomer composition containing (A) at least one thermoplastic resin having an air permeation coefficient of $10 \times 10^{-12}$ cc·cm/cm$^2$·sec·cmHg or less, preferably $0.1 \times 10^{-12}$ to $10 \times 10^{-12}$ cc·cm/cm$^2$·sec·cmHg and a Young's modulus of more than 500 MPa, preferably 510 to 3000 MPa, and (B) at least one elastomer component having an air permeation coefficient of $50 \times 10^{-12}$ cc·cm/cm$^2$·sec·cmHg or more, preferably $50 \times 10^{-12}$ to $100 \times 10^{-12}$ cc·cm/cm$^2$·sec·cmHg and a Young's modulus of 500 MPa or less, preferably 0.01 to 100 MPa, each in an amount of at least 30% by weight, preferably 40 to 70% by weight, based upon the total polymer components and having an air permeation coefficient of $100 \times 10^{-12}$ cc·cm/cm$^2$·sec·cmHg or less, preferably $3 \times 10^{-12}$ to $60 \times 10^{-12}$ cc·cm/cm$^2$·sec·cmHg, for the inner liner of a tire, the heat buildup of the tire can be reduced and the weight can be reduced, since the inner liner of the conventional butyl rubber having a large heat buildup can be replaced with a thin film-like thermoplastic elastomer. Further, the side reinforcing rubber of the tire is formed by a rubber composition composed of 100 parts by weight of a total rubber amount containing at least 40 parts by weight, preferably 40 to 60 parts by weight, of an ethylenically unsaturated nitrile-conjugated diene-based highly saturated rubber having a content of conjugated diene units of 30% by weight or less, preferably 10 to 25% by weight, into which 120 parts by weight or less, preferably 20 to 80 parts by weight, of a metal salt of an ethylenic unsaturated carboxylic acid and an organic peroxide are compounded, it is possible to maintain the runflat capability even when making the side reinforcing rubber thinner and therefore possible to further reduce the weight of the tire.

By arranging, between the inner liner composed of the above specific thermoplastic elastomer composition and the reinforcing rubber layer and carcass composed of the above specific rubber composition, an adhesive layer containing a diene-based polymer having a carboxyl group, epoxy group or isocyanate group and a tackifier resin, the rubber composition and the thermoplastic elastomer composition are firmly bonded at the side part of the tire, the peeling of the inner linear is greatly reduced even when driving on the tire at zero pressure, and the runflat capability of the tire can be greatly improved.

The thermoplastic resin compounded, as the component (A), in the thermoplastic elastomer composition used for the inner liner member of a pneumatic tire having a runflat capability according to the present invention is at least one thermoplastic resin having an air permeation coefficient of $100 \times 10^{-12}$ cc·cm/cm$^2$·sec·cmHg or less, preferably $0.1 \times 10^{-12}$ to $10 \times 10^{-12}$ cc·cm/cm$^2$·sec·cmHg and a Young's modulus of more than 500 MPa, preferably 510 to 3000 MPa. The amount compounded is at least 30% by weight, preferably 30 to 60% by weight, based upon the entire polymer components.

As the thermoplastic resin component (A), for example, the following thermoplastic resins and any resin compositions of the same or containing the same may be mentioned. These may also be thermoplastic resin compositions containing therein conventional additives such as plasticizers, softening agents, fillers, reinforcing agents, processing aids, stabilizers, antioxidants.

Polyamide-based resins (for example, Nylon 6 (N6), Nylon 66 (N66), Nylon 46 (N46), Nylon 11 (N11), Nylon 12 (N12), Nylon 610 (N610), Nylon 612 (N612), Nylon 6/66 copolymer (N6/66), Nylon 6/66/610 copolymer (N6/66/610), Nylon MXD6, Nylon 6T, Nylon 6/6T copolymer, Nylon 66/PP copolymer, and Nylon 66/PPS copolymer), polyester-based resins (for example, polybutylene terephthalate (PBT), polyethylene terephthalate (PET), polyethylene isophthalate (PEI), PET/PEI copolymer, polyarylate (PAR), polybutylene naphthalate (PBN), liquid crystal polyester, polybutylene terephthalate/polytetramethylene glycol copolymer, polyoxyalkylene diimidodiacid/polybutylene terephthalate copolymer, or other aromatic polyesters), polynitrile-based resins (for example, polyacrylonitrile (PAN), polymethacrylonitrile, acrylonitrile/styrene copolymer (AS), methacrylonitrile/styrene copolymer, methacrylonitrile/styrene/butadiene copolymer), poly(meth)acrylate-based resins (for example, polymethyl methacrylate (PMMA) and polyethyl methacrylate), polyvinyl-based resins (for example, vinyl acetate (EVA), polyvinyl alcohol (PVA), vinyl alcohol/ethylene copolymer (EVOH), polyvinylidene chloride (PDVC, polyvinyl chloride (PVC), polyvinyl chloride/vinylidene chloride copolymer, vinylidene chloride/methyl acrylate copolymer), cellulose-based resins (for example, cellulose acetate and cellulose acetobutyrate), fluorine-based resins (for example, polyvinylidene fluoride (PVDF), polyvinyl fluoride (PVF), polychlorofluoroethylene (PCTFE), and tetrafluoroethylene/ethylene copolymer (ETFE)), and imide-based resins (for example, aromatic polyimide (PI)) may be mentioned. The preferable thermoplastic resins are polyamide-based resins.

The elastomer component to be compounded, as component (B), into the thermoplastic elastomer composition used for the inner liner member of the pneumatic tire having a runflat performance according to the present invention is an elastomer composition composed of at least one elastomer having an air permeation coefficient of $50 \times 10^{-12}$ cc·cm/cm$^2$·sec·cmHg or more, preferably $50 \times 10^{-12}$ to $100 \times 10^{-12}$ cc·cm/cm$^2$·sec·cmHg and a Young's modulus of 500 MPa or less, preferably 0.01 to 100 MPa, or any blends thereof or those containing therein necessary amounts of conventional compounding agents generally compounded into elastomers to improve the dispersability, heat resistance, etc. of the elastomers, such as, for example, a reinforcing agent, filler, crosslinking agent, softening agent, antioxidant or processing aid. The amount compounded is at least 30% by weight preferably 40 to 70% by weight, based upon the entire polymer ingredients.

The elastomer forming the elastomer component is not particularly limited so long as it has the above air permeation coefficient and Young's modulus valves, and, for example, the following may be mentioned:

Diene-based rubbers and their hydrogenated products (for example, NR, IR, epoxylated natural rubber, SBR, BR (high cis BR and low cis BR), NBR, hydrogenated NBR, hydrogenated SBR), olefin-based rubbers (for example, ethylenepropylene rubber (EPDM, EPM), maleic acid-modified ethylenepropylene rubber (M-EPM), butyl rubber (IIR), isobutylene and aromatic vinyl or diene-based monomer copolymers, acryl rubber (ACM), and ionomers), halogen-containing rubbers (for example, Br—IIR, Cl—IIR, brominated isobutylene p-methylstyrene copolymer (Br—IPMS), chloroprene rubber (CR), hydrin rubber (CHR, CHC), chlorosulfonated polyethylene (CSM), chlorinated polyethylene (CM), maleic acid-modified chlorinated polyethylene (M-CM), silicone rubbers (for example, methylvinyl silicone rubber, dimethyl silicone rubber, methylphenylvinyl silicone rubber), sulfur-containing rubbers (for example, polysulfide rubber), fluororubbers (for example, vinylidene-fluoride-based rubber, fluorine-containing vinyl ether-based rubber, tetrafluoroethylene-propylene-based rubber, fluorine-containing silicone rubber, fluorine-containing phosphagen-based rubber), thermoplastic elastomers (for example, styrene-based elastomers, olefin-based elastomers, polyester-based elastomers, urethane-based elastomers, polyamide-based elastomers), etc. may be mentioned. Preferable elastomer ingredients are isobutylene-based rubbers or their modified products (for example, IIR, Br—IIR, Cl—IIR, Br—IPMS, etc.

The ratio of the thermoplastic resin (A) and the elastomer ingredient (B) in the thermoplastic elastomer composition used for the inner liner of the pneumatic tire having a runflat capability according to the present invention may be suitably determined by the balance of the thickness, air barrier property and flexibility of the film, but the preferable range is, in terms of weight ratio, 10/90 to 90/10, more preferably 20/80 to 85/15.

As the polymer component having a carboxyl group, epoxy group or isocyanate group, which forms the adhesive used for bonding, by vulcanization, the inner liner and the carcass in the pneumatic tire having a runflat capability of the present invention, for example, NR, SBR, BR, IR, IIR, EPDM, SBS, SIS, SIBS, SIPS, PE, EEA, or another polymer modified with maleic acid anhydride or modified by carboxyl, these polymers copolymerized with acrylic acid (AA), methacrylic acid (MA), allylglycidyl ether (AGE), glycidyl methacrylate (GMA), etc. or reacted with peracetic acid to epoxidize them may be used. A polymer having an isocyanate group can be produced by adding, to a polymer having a hydroxy group in the molecule thereof or at its molecule's end, an excess amount of di- or tri-isocyanate etc. Among these, from the viewpoint of processability, an elastomer having thermoplasticity, for example, maleic anhydride-modified SBS, E-GMA-VA, E-GMA-MA, epoxidized SBS, maleic anhydride-modified BR, maleic anhydride-modified IR, etc. are preferable. Further, the amount compounded of these polymer components is suitably at least 30 parts by weight, preferably 30 to 70 parts by weight. If the amount compounded is less than 30 parts by weight, the adhesion to the thermoplastic elastomer becomes insufficient.

As the tackifier resin compounded into the adhesive, for example, a terpene resin, pinene resin, aromatic modified terpene resin, hydrogenated terpene resin, terpenephenol copolymer resin, styrene resin, rosin ester-based resin, cumarone-indene resin, petroleum resin, etc. may be mentioned. The tackifier resin is selected according upon the compatibility with the polymer and compatibility with the object to be adhered, but in particular, a terpene-based resin, its derivatives (for example, a terpene resin, pinene resin, dipentene resin), or their modified products (for example, aromatic modified terpene resin, hydrogenated terpene resin, terpenephenol resin), rosin ester-based resin, etc. are preferable. The amount compounded of these tackifier resins is preferably 20 to 150 parts by weight, more preferably 30 to 100 parts by weight, based upon 100 parts by weight of the polymer components forming the adhesive. If the amount compounded is less than 20 parts by weight, the tack at the time of tire formation is insufficient, while if more than 150 parts by weight, the cohesive power of the adhesive is insufficient and the adhesive is liable to agglomerate and breakage is liable to occur at the time of tire formation.

In the pneumatic tire having a runflat capability of the present invention, a rubber composition composed of 100 parts by weight of a total amount of a rubber containing at least 40 parts by weight, preferably 40 to 60 parts by weight, of an ethylenically unsaturated nitrile-conjugated diene-based highly saturated rubber having a content of conjugated diene units of 30% by weight or less, preferably 10 to 25% by weight, into which 120 parts by weight or less, preferably 20 to 80 parts by weight, of a metal salt of an ethylenic unsaturated carboxylic acid and an organic peroxide is used for the crescent shaped reinforcing rubber of the side part of the tire, the volume of the reinforcing rubber can be reduced, whereby a large reduction in weight of the tire can be achieved.

The above ethylenically unsaturated nitrile-conjugated diene-based highly saturated rubber is already known. It is a copolymer of ethylenically unsaturated nitrile such as acrylonitrile, methacrylonitrile, and conjugated diene monomers such as 1,3-butadiene, isoprene, 1,3-pentadiene; and multi copolymer of the above two types of monomers and monomers capable of copolymerizing with these two types of monomers such as vinyl aromatic compounds, (meth) acrylic acid, alkyl(meth)acrylate, alkoxyalkyl(meth)acrylate cyanoalkyl(meth)acrylate. Specifically, an acrylonitrile-butadiene copolymer rubber, acrylonitrile-isoprene copolymer rubber, acrylonitrile-butadiene-isoprene copolymer rubber, acrylonitrile-butadiene-acrylate copolymer rubber, acrylonitrile-butadiene-acrylate-methacrylic acid copolymer rubber, etc. may be mentioned. These rubbers contain 10 to 50% by weight, preferably 20 to 35% by weight, of ethylenically unsaturated nitrile units and the content of the conjugated diene unit is reduced to 30% by weight or less, preferably 10 to 25% by weight, by a means such as partial hydrogenation of the conjugated diene units.

As the metal salt of an ethylenically unsaturated carboxylic acid used in the present invention, a metal salt such as zinc, magnesium, calcium, aluminum salt of unsaturated monocarboxylic acid such as (meth)acrylic acid, crotonic acid, monoester of an unsaturated dicarboxylic acid such as maleic acid, fumaric acid or another unsaturated dicarbon, monomethyl maleate, monoethyl maleate may be mentioned. The preferable metal salt of an ethylenic unsaturated carboxylic acid is zinc (meth)acrylate (i.e., correctly, zinc di(meth)acrylate).

The method of mixing, into the ethylenically unsaturated nitrile-conjugated diene-based highly saturated rubber in the present invention, a predetermined amount of a metal salt of an ethylenically unsaturated carboxylic acid is not particularly limited, but it is possible to use a mixer generally used in the rubber industry such as a roll, Banbury mixer, kneader, single-screw extruder, twin-screw extruder, etc. Further, in addition to the method of directly mixing, into the ethylenically unsaturated nitrile-conjugated diene-based highly saturated rubber, for example, zinc (meth)acrylate, it is also possible to adopt the method of first mixing therein zinc compound such as zinc oxide, zinc carbonate, followed by sufficiently dispersing, and then mixing, or causing the absorption, with (meth)acrylic acid to produce, in situ, zinc (meth)acrylate in the polymer. This method is preferable since an extremely good dispersion of zinc (meth)acrylate is obtained. Further, it is preferable to use a composition composed of an ethylenically unsaturated nitrile-conjugated diene-based highly saturated rubber, into which zinc (meth) acrylate and a zinc compound are dispersed in advance. Such a compound is available as the "ZSC" (trademark) series made by Nippon Zeon, for example ZSC2295, ZSC2295N, ZSC2395, and ZSC2298.

Further, in the present invention, an ethylenically unsaturated nitrile-conjugated diene-based highly saturated rubber crosslinked with an organic peroxide is used. Examples of the organic peroxide usable in the present invention one are those usually used in the peroxide vulcanization of rubber are dicumyl peroxide, di-t-butyl peroxide, t-butyl-cumyl peroxide, benzoyl peroxide, 2,5-dimethyl(t-butylperoxy)hexine, 2,5-dimethyl-2,5-di(benzoylperoxy)hexane, 2,5-dimethyl-2,5-mono(t-butylperoxy)hexane, α,α1-bis(t-butylperoxy-m-isopropyl)hexene, etc. One or more of these organic peroxides may be used. The compounding amount thereof is not particularly limited, but preferably is 0.2 to 10 parts by weight, more preferably 0.2 to 6 parts by weight, based upon 100 parts by weight of rubber.

The rubber composition composed of the ethylenically unsaturated nitrile-conjugated diene-based highly saturated rubber, into which predetermined amounts of a metal salt of an ethylenic unsaturated carboxylic acid and an organic peroxide are compounded, may further suitably contain therein, for example reinforcing agent such as carbon black, silica, crosslinking aids such as triallyl isocyanulate, a higher ester of methacrylic acid, a phthalic acid diallyl ester, m-phenylene bismaleimide, 1,2-polybutadiene, other conventional additives generally used in the rubber industry such as a plasticizer, oil, antioxidant, stabilizer, adhesive, resin, processing aid, etc.

In the present invention, when, using for the crescent shaped reinforcing rubber, a rubber composition comprised of the ethylenically unsaturated nitrile-conjugated diene-based highly saturated rubber, into which a metal salt of an ethylenic unsaturated carboxylic acid and an organic peroxide are compounded, to ensure a firm adhesion between the reinforcing rubber and the carcass, it is preferable to arrange, between these members, a rubber composition composed of 100 parts by weight of a total amount of (a) 50 to 85 parts by weight, preferably 50 to 70 parts by weight, of at least one diene-based rubber selected from the group consisting of natural rubber, polyisoprene rubber, polybutadiene rubber, and conjugated diene-aromatic vinyl copolymer rubber and (b) 15 to 50 parts by weight, preferably 30 to 50 parts by weight, of an ethylenically unsaturated nitrile-conjugated diene-based highly saturated rubber having a content of conjugated diene units of 30% by weight or less, preferably 10 to 25% by weight, into which (c) 10 to 60 parts by weight, preferably 10 to 40 parts by weight, of a metal salt of an ethylenic unsaturated carboxylic acid, (d) 0.3 to 10 parts by weight, preferably 1 to 7 parts by weight, of an organic peroxide, and (e) 3 to 50 parts by weight, preferably 5 to 30 parts by weight, of a co-agent in the state of liquid at room temperature and having an acryl group, methacryl group or allyl group are compound.

As the co-agent usable as the component (e) in the adhesive rubber composition, for example, a methacrylic acid ester, triallyl isocyanulate, a metal salt of methacrylic acid or acrylic acid, phthalic acid diallyl ester, 1,2-polybutadiene, etc. may be mentioned.

In the adhesive rubber composition according to the present invention, by using a process (two-stage mixing method) of first mixing an ethylenic unsaturated nitrile-conjugated diene-based highly saturated rubber (b) having a content of conjugated diene units of 30% or less and a metal salt of an ethylenic unsaturated carboxylic acid (c), then compounding thereinto the diene-based rubber (a) and the organic peroxide (d), co-agent (e), etc., the processability and adhesion of the adhesive rubber composition are improved.

The adhesive rubber composition may suitably contain therein compounding agents generally compounded into rubber, such as, for example, filler such as carbon, silica, conventional additives such as an antioxidant, plasticizer, processing aid, resin, adhesive, crosslinking aid, vulcanization aid, vulcanization accelerator, tackifier.

When arranging the above adhesive rubber composition between the reinforcing rubber and the carcass of the pneumatic tire having the runflat capability according to the present invention, the thickness of the adhesive rubber layer is preferably 0.2 to 1.5 mm, more preferably 0.5 to 1.0 mm. By this range of the thickness, the safety tire can be lightened and a desired superior runflat capability can be obtained.

EXAMPLES

The present invention will be explained by Examples and Comparative Examples, but the scope of the present invention is, of course, not limited to these Examples.

Building of Test Tire

The compounding compositions "a" to "g" shown in the following Table I to Table III were used to form reinforcing liners and inner liner layers of predetermined formulations and thicknesses shown in Table IV. These were used for building runflat tires having a size of 245/45ZR17 in a normal procedure. These were used as test tires.

Test Methods

1) Runflat running test: A test tire was attached to the front right side of a 2500 cc FR passenger car and run counter-clockwise on a oval road in a state of an air pressure of 0 kPa at 90 km per hour. The running distance until the tire broke down and could not be driven on was indicated indexed to the tire of the Reference Example as "100". The larger the number, the better the runflat distance.

2) Liner delamination: After the running test, breakdown at the inner surface of the tire was visually examined and evaluated in three rankings:

A: almost no delamination,

B: delamination at part of the circumference, and

C: delamination over the entire tire circumference.

TABLE I

Inner Liner Rubber Formulation

| Row Material | Commercial Product | Manufacturer | Formulation "a" (parts by weight) | Formulation "b" (parts by weight) |
|---|---|---|---|---|
| Natural rubber | TSR20 | — | 20 | — |
| Brominated butyl rubber | Bromobutyl 2255 | Exxon Mobil Chemical | 80 | — |
| Br-IPMS | EXXPRO 89-4 | Exxon Mobil Chemical | — | 100 |
| PA 6/66 | Ube Nylon 5033B | Ube Industries | — | 30 |
| PA 11 | Rilsan BESN 0 TL | Atfina Japan | — | 40 |
| MAH-EEA | HRP AR201 | Mitsui Dupont Polychemical | — | 10 |
| Carbon black | Diablack E | Chubu Carbon | 60 | — |
| Zinc oxide | Zinc White #3 | Seido Chemical | 4 | 0.2 |
| Stearic acid | Beads Stearic Acid | Kao | 1 | 0.6 |
| Zinc stearate | Zinc stearate | Seido Chemical | — | 0.3 |
| Aromatic oil | Extract No. 4S | Showa-Shell Oil | 5 | — |
| Plasticizer | BM-4 | Daihachi Chemical Industry | — | 10 |
| Antioxidant | Irganox 1098 | Ciba Specialty Chemicals | — | 0.5 |
| Antioxidant | Cuprous iodide | Nippon Chemical Industry | — | 0.1 |
| Sulfur | Crystex HSOT20 | Flexis | 1 | — |
| Accelerator | Noccelar NS-F | Ouchi Shinko Chemical | 1 | — |

TABLE II

Tackifier Adhesive Formulation

| Raw Material | Commercial Product | Manufacturer | Formulation "d" (parts by weight) | Formulation "d" (parts by weight) |
|---|---|---|---|---|
| ESBS | Epofliend A1020 | Daicel Chemical Industry | 50 | — |
| MAH-SBS | Tufprene 912 | Asahi Kasei | — | 40 |
| SBS | Tufprene A | Asahi Kasei | 50 | 60 |
| Terpene resin | YS Resin TR105 | Yasuhara Chemical | 50 | 60 |
| Organic peroxide | Parkadox 14/40 | Kayaku Akzo | 1 | 1 |

TABLE III

Reinforcing Rubber and Adhesive Rubber Formulation

| Raw Material | Commercial Product | Manufacturer | Formulation "e" (parts by weight) | Formulation "f" (parts by weight) | Formulation "g" (parts by weight) |
|---|---|---|---|---|---|
| Natural rubber | TSR20 | — | 50 | 10 | 60 |
| Polybutadiene rubber | Nipol BR-1220 | Nippon Zeon | 50 | 30 | — |
| Hydrogenated NBR | Zetpol 2030L | Nippon Zeon | — | 60 | 40 |
| Zinc methacrylate | R-20S | Asada Chemical | — | 60 | 40 |
| Carbon black | Seast 300 | Tokai Carbon | 45 | — | 30 |
| Zinc oxide | Zinc White #3 | Seido Chemical | 5 | 5 | 5 |
| Stearic acid | Beads Stearic Acid | Kao | 1.5 | 1 | 1 |
| Antioxidant | Noccelar 6C | Ouchi Shinko Chemical | 2 | 0.5 | 0.5 |
| Antioxidant | Naugard 445 | Uniroyal | — | 1.5 | 1.5 |
| Sulfur | Crystex HSOT20 | Flexis | 6 | — | — |
| Accelerator | Noccelar NS-F | Ouchi Shinko Chemical | 2 | — | — |
| Organic peroxide | Parkadox 14/40 | Kayaku Akzo | — | 4 | 3 |

TABLE IV

|  | Ref. Ex. | Ex. 1 | Comp. Ex. 1 | Ex. 2 | Comp. Ex. 2 | Ex. 3 | Ex. 4 |
|---|---|---|---|---|---|---|---|
| Inner liner formulation (Table I) | Form. a | Form. b | Form. b | Form. b | Form. a | Form. b | Form. b |
| Tackifier adhesive formulation (Table II) | — | Form. c | Form. c | Form. c | — | Form. c | Form. d |
| Reinforcing rubber layer formulation (Table III) | Form. e | Form. e | Form. e | Form. f | Form. f | Form. f | Form. f |
| Adhesive rubber formulation (Table III) | — | — | — | Form. g | Form. g | Form. g | Form. g |
| Reinforcing liner hardness (JIS A hardness) | 78 | 78 | 78 | 83 | 83 | 83 | 83 |
| Reinforcing liner maximum thickness (mm)*1 | 12 | 12 | 10 | 12 | 10 | 9 | 9 |
| Inner liner layer thickness (mm) | 1.2 | 0.15 | 0.15 | 0.15 | 1.2 | 0.15 | 0.15 |
| Tire weight (kg) | 13.4 | 12.7 | 12.3 | 12.6 | 13.0 | 12.0 | 12.0 |
| Runflat distance (index) | 100 | 140 | 53 | 227 | 104 | 110 | 106 |
| Liner delamination (3-rank evaluation) | C | A | A | A | B | A | A |

(Note)
*1: Thickness including adhesive rubber layer (0.5 mm)

INDUSTRIAL APPLICABILITY

As is clear from the results shown in the above Table IV, a pneumatic tire using an inner liner of the compounding composition according to the present invention, reinforcing rubber layer, adhesive, and adhesive rubber can greatly reduce the tire weight and greatly improve the runflat capability.

The invention claimed is:

1. A pneumatic tire having a runflat capability provided with a crescent-shaped reinforcing rubber layer at the side part thereof comprising an inner layer, which comprises a thermoplastic elastomer composition containing (A) at least one thermoplastic resin having an air permeation coefficient of $100 \times 10^{-12}$ cc·cm/cm$^2$·sec·cmHg or less and a Young's modulus of more than 500 MPa and (B) at least one elastomer component having an air permeation coefficient of $50 \times 10^{-12}$ cc·cm/cm$^2$·sec·cmHg or more and a Young's modulus of 500 MPa or less each in an amount of at least 30% by weight based upon the total polymer components and having an air permeation coefficient of $100 \times 10^{-12}$ cc·cm/cm$^2$·sec·cmHg or less, wherein the crescent shaped reinforcing rubber of the side part thereof comprises a rubber composition composed of 100 parts by weight of a total rubber amount of a rubber containing at least 40 parts by weight of an ethylenically unsaturated nitrile-conjugated diene-based highly saturated rubber having a content of conjugated diene units of 30% by weight or less, into which 120 parts by weight or less of a metal salt of an ethylenically unsaturated carboxylic acid and an organic peroxide are compounded, and wherein, between the crescent shaped reinforcing rubber and the carcass, a rubber composition comprising 100 parts by weight of a total rubber amount of 50 to 85 parts by weight of at least one diene-based rubber selected from the group consisting of natural rubber, polyisoprene rubber, polybutadiene rubber and conjugated diene-aromatic vinyl copolymer rubber and 15 to 50 parts by weight of an ethylenically unsaturated nitrile-conjugated diene-based highly saturated rubber having a content of conjugated diene units of 30% by weight or less, and 10 to 60 parts by weight of a metal salt of an ethylenic unsaturated carboxylic acid, 0.3 to 10 parts by weight of an organic peroxide and 5 to 50 parts by weight of a co-agent in the state of liquid at room temperature and having an acryl group, methacryl group or allyl group.

2. A pneumatic tire as claimed in claim 1, wherein said metal salt of an ethylenic unsaturated carboxylic acid is zinc acrylate or zinc methacrylate.

3. A pneumatic tire as claimed in claim 1, wherein the inner liner comprises said thermoplastic elastomer composition and a carcass and a reinforcing rubber layer are bonded, by vulcanization, with an adhesive comprising 100 parts by weight of a total amount of at least 30 parts by weight of a polymer having a carboxyl group, epoxy group or isocyanate group and the balance of a styrene-butadiene-styrene-based copolymer or styrene-isoprene-styrene-based copolymer or a partially hydrogenated product thereof, into which 20 to 150 parts by weight of a tackifying resin is compounded.

4. A pneumatic tire as claimed in claim 3, wherein said tackifying resin is a terpene-based resin or a derivative or modified resin thereof.

* * * * *